(12) United States Patent
Muralimanohar et al.

(10) Patent No.: US 8,108,718 B2
(45) Date of Patent: Jan. 31, 2012

(54) CHECKPOINTING IN MASSIVELY PARALLEL PROCESSING

(75) Inventors: Naveen Muralimanohar, Santa Clara, CA (US); Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 130 days.

(21) Appl. No.: 12/618,675

(22) Filed: Nov. 13, 2009

(65) Prior Publication Data

US 2011/0119525 A1    May 19, 2011

(51) Int. Cl.
  *G06F 11/00*  (2006.01)
(52) U.S. Cl. ......................................................... 714/12
(58) Field of Classification Search ....................... 714/6
  See application file for complete search history.

(56) References Cited

U.S. PATENT DOCUMENTS

| | | | |
|---|---|---|---|
| 5,630,047 A * | 5/1997 | Wang | 714/15 |
| 7,743,381 B1 * | 6/2010 | Tran | 718/106 |
| 2007/0277056 A1 * | 11/2007 | Varadarajan et al. | 714/15 |
| 2010/0036843 A1 * | 2/2010 | MacNaughton et al. | 707/8 |
| 2011/0173488 A1 * | 7/2011 | Blumrich et al. | 714/4.1 |

* cited by examiner

*Primary Examiner* — Amine Riad (57) ABSTRACT

One embodiment is a method that performs a local checkpoint at a processing node in a massively parallel processing (MPP) system that executes a workload with a plurality of processing nodes. The local checkpoint is stored in local memory of the processing node. While the workload continues to execute, a global checkpoint is performed from the local checkpoint stored in the local memory.

21 Claims, 5 Drawing Sheets

CHECKPOINTING IN MASSIVELY PARALLEL PROCESSING

BACKGROUND

Massively parallel processing (MPP) systems have a large number of independent processors or nodes that are connected together and execute in parallel to form a very large computer. MPP systems are designed to solve complex mathematical problems that are highly computationally intensive. These problems are capable of exploiting the entire processing power of the system and typically take many days to complete.

Even though the individual nodes in an MPP system are designed to have a high Mean Time to Failure (MTTF) value, the reliability of the total system goes down significantly as the number of nodes goes up. For example, if the MTTF of a processor is 1000 days, a system with thousand such processors will have a net MTTF value of one day.

As a result, modern supercomputers with thousands of compute nodes encounter frequent crashes that severely impact the workload completion time.

DETAILED DESCRIPTION

Embodiments relate to systems, methods, and apparatus that utilize local checkpointing in massively parallel processing (MPP) systems. Example embodiments use local checkpointing with non-volatile memories. Global checkpointing is performed using data that is already checkpointed and stored in local non-volatile memory of each node. Local checkpoints are performed without network transfers, such as to a central storage device. Global checkpoints are performed without significantly stalling program execution beyond that used for executing the local checkpoints.

As used herein and in the claims, the term "massively parallel processing" or "MPP" is a computer system with many independent processors that are connected together and execute in parallel to form a very large computer. The term massive connotes hundreds or thousands of processors. MPP includes single-chip processor arrays that include hundreds or thousands of processors and associated RAM memory that pass information to each other through a connection of channels. MPP is distinguished from distributed computing where massive numbers of separate computers work together to solve multiple problems simultaneously.

Furthermore, as used herein and in the claims, the term "checkpoint" or "checkpointing" is a technique in computing systems (such as MPP systems) that stores snapshots of current applications states. For example, the snapshots are used to restart or restore the computer system after a failure.

Checkpoints taken in the MPP system that are not private to a node are referred to herein as "global checkpoints." On the other hand, checkpoints taken privately in each node are referred to herein as "local checkpoints." In other words, global checkpoints are globally accessible by any node in the system whereas, local checkpoints can be accessed only directly by or indirectly through the owner node that initiated the local checkpoint.

Overview

To tolerate the rising failure rates and reduce its impact on workload runtime, MPP systems are typically equipped with a centralized non-volatile storage system (typically built from an array of disks) that takes frequent synchronized checkpoints of every node (i.e., the processor and its associated main memory) in the system. The number and frequency of checkpoints depends on various factors, such as the desired wall clock execution time, requests made by the executing application, the I/O bandwidth, etc.

Unlike global checkpoints, local checkpoints can be accessed by its owner processor or local node, but not by other nodes. As a result, if an owner node completely fails, the checkpointed data cannot be accessed. Since a centralized storage device is directly connected to the MPP network, the storage device can be accessed by every node in the system and hence its use is referred to as global checkpointing.

In the event of a failure, the most recently stored system state is used to reinstate the system. Reinstating the system saves time when compared to restarting the program from the beginning.

To provide complete fault coverage and tolerate failures during checkpointing in a system using centralized storage, multiple backups are maintained in the same storage system. Such centralized systems have limitations. For example, checkpointing in a single centralized medium is inherently not scalable. Furthermore, such systems have an overhead that reduces workload performance. A centralized medium to store checkpoints can consume more than 75% of input/output (I/O) bandwidth during checkpointing operations and hence leave little bandwidth for actual workloads. Further yet, the power requirements of MPP systems have already reached 4 Megawatts or more and are continuously growing. Though the energy required for a checkpointing process is negligible when compared to the total system power, the impact of its overhead on expected workload runtime to completion significantly increases the total energy required to execute a program.

A main source of delay in checkpointing is the time spent on writing checkpoints from the individual nodes to the storage device. Due to the limited bandwidth provided by the network and the storage system, these operations are relatively slow and time consuming. Since the state of a system has to be preserved while checkpointing, the entire MPP system is stalled until the checkpoint operation completes. This stall results in severe degradation of workload performance.

Discussion of Figures

Figure 1:
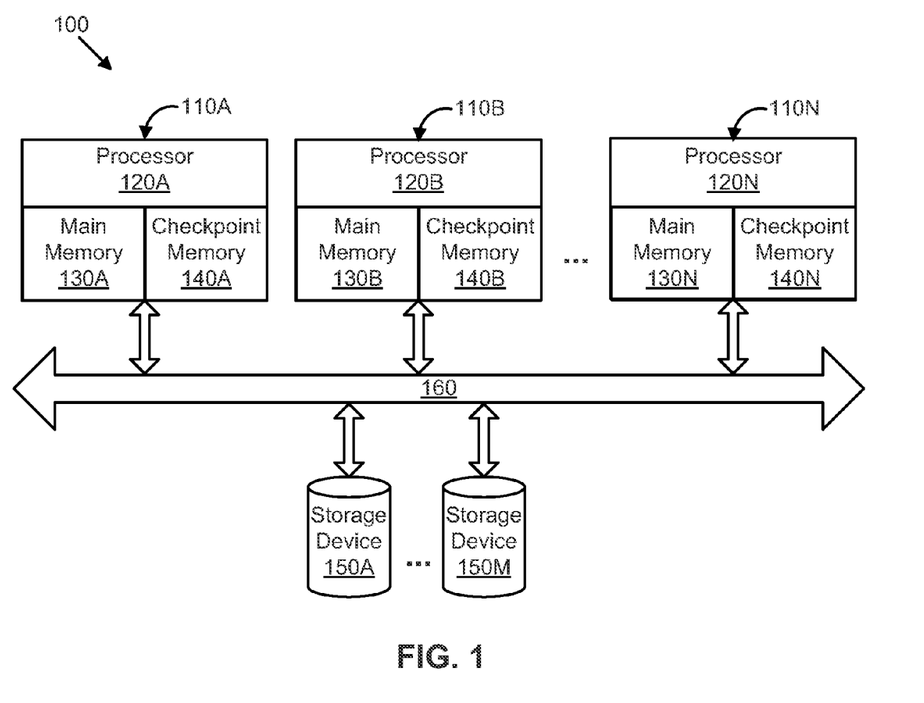
FIG. 1 shows a massively parallel processing (MPP) system that uses local checkpointing in accordance with an example embodiment of the present invention.

FIG. 1 shows a massively parallel processing (MPP) system 100 that uses local checkpointing in accordance with an example embodiment. The system 100 includes a massive number (i.e., hundreds, thousands, or more) of processing nodes (shown as 110A, 110B, to 110N). Each node includes a processor (shown as 120A, 120B, to 120N), a main memory (shown as 130A, 130B, to 130N), and a local checkpoint memory (shown as 140A, 140B, to 140N). Each node also connects to one or more storage devices (shown as 150A to 150M) through one or more networks or interconnections 160.

Figure 2:
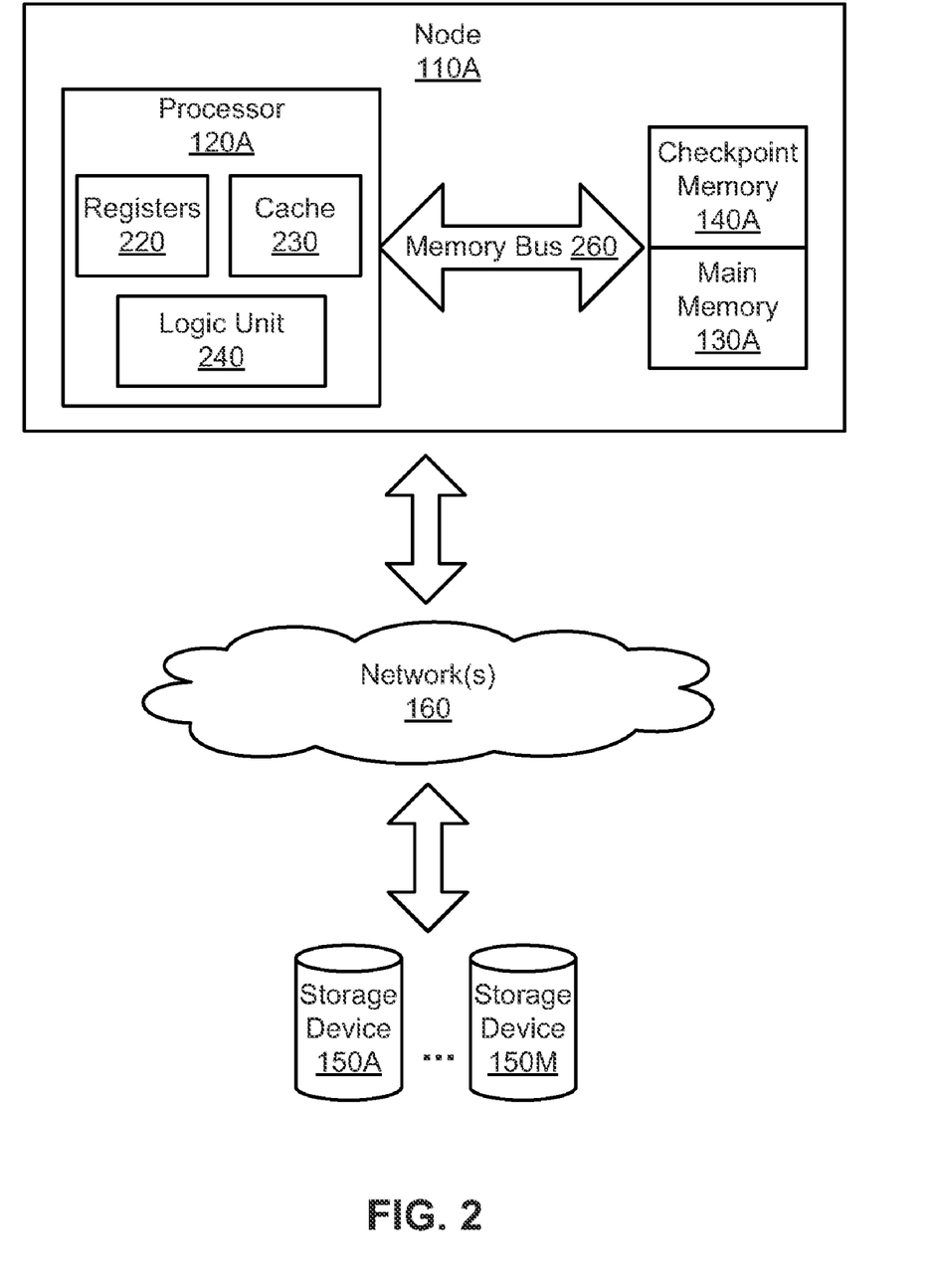
FIG. 2 shows a node of an MPP system connected to storage devices in accordance with an example embodiment of the present invention.

FIG. 2 shows a more detailed view of the processing node 110A in the MPP system 100. The processor 120A includes registers 220, cache memory 230, and a logic unit 240 which connect through a local memory bus 260 to the main memory 130A and checkpoint memory 140A. The node 110A connects through one or more networks 160 to the storage devices 150A to 150M.

In one example embodiment, the checkpoint memory 140A is included with or forms part of the main memory 130A.

As used herein and in the claims, "main memory" is memory directly accessible to the processor or central processor unit (CPU). For example, main memory is primary storage that connects to a processor using an address bus (which carries the memory address of the desired location) and a data bus (which is used to read or write the data), shown in FIG. 2 as memory bus 260.

As used herein and in the claims, a "storage device" is a device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller.

The memory bus 260 between the main memory 130A and checkpoint memory 140A and processor 120A has superior bandwidth characteristics or capabilities over the connection between the nodes and the storage devices (i.e., through network or connections 160).

Due to the high transfer rates provided by the memory bus (compared to the network or the file system bandwidth), a local checkpointing operation is more than two orders of magnitude faster compared to a global checkpoint operation. Thus, the rollback time from a local checkpoint is faster by more than two orders of magnitude when compared to the global rollbacks that involve network transfers.

Example embodiments add non-volatile local checkpoint memories (140A . . . 140N) in each node to store local checkpoints. Global checkpoints are then made from some or all of the local checkpoints in parallel with continued program execution. A significant number of failures can be recovered by storing the system state locally in a non-volatile storage medium.

One embodiment uses PCRAM memory technology to store local checkpoints in the checkpoint memory (140A . . . 140N). This memory is relatively fast, is non-volatile with an extended life time (compared to other non-volatile memories), and has no standby power.

In one example embodiment local and global checkpointing operations are completely disjoint. In other words, local and global checkpoint frequencies can be independently adjusted. Furthermore, the frequency of such operations is dynamic and appropriately adjusted to meet the failure rates of a system. For example, transient faults or software errors benefit from local checkpoints while permanent node failures continue to use global checkpoints. A system with more transient faults can take more frequent local checkpoints without accessing the expensive global storage. A failure is transient if the node that encountered failure is still functional and is only temporarily offline. Transient errors can be recovered by a simple reboot operation. On the other hand, a permanent node failure implies failed hardware components. Recovering from permanent failures typically requires replacement of failed components.

Local checkpoints are distributed and stored locally in each node, and can cater to the growing demand put forth by the rising transient errors. The increase in permanent failures of nodes that requires global checkpoint is relatively low compared to transient failures. Hence, the I/O requirements of the proposed optimization are significantly reduced.

Local checkpoints are performed or executed with the local processor for the respective node. Once the local checkpoints are performed, the global checkpoints occur as a background process using the local copy without significantly stalling the main program. Example embodiments thus reduce or eliminate bottlenecks during the checkpoint process in MPP systems.

In one example embodiment, the local and global checkpoint operations occur at different times (i.e., local and global copies are not taken at the same time and at the same frequency). Executing these operations at different times eliminates or reduces slow network transfers required to make global checkpoints that can occur in a critical path of the executing program, which slows the program and ultimately increases workload time.

Furthermore, one example embodiment stores the local checkpoints in non-volatile memory, as opposed to volatile memory (such as dynamic random access memory, DRAM, which needs constant external power). By utilizing a non-volatile memory at each node, example embodiments increase a percentage of failures that can be recovered using a local checkpoint. As such, the frequency of expensive global checkpoints is reduced since failures that require global rollbacks are less common.

Figure 3A:
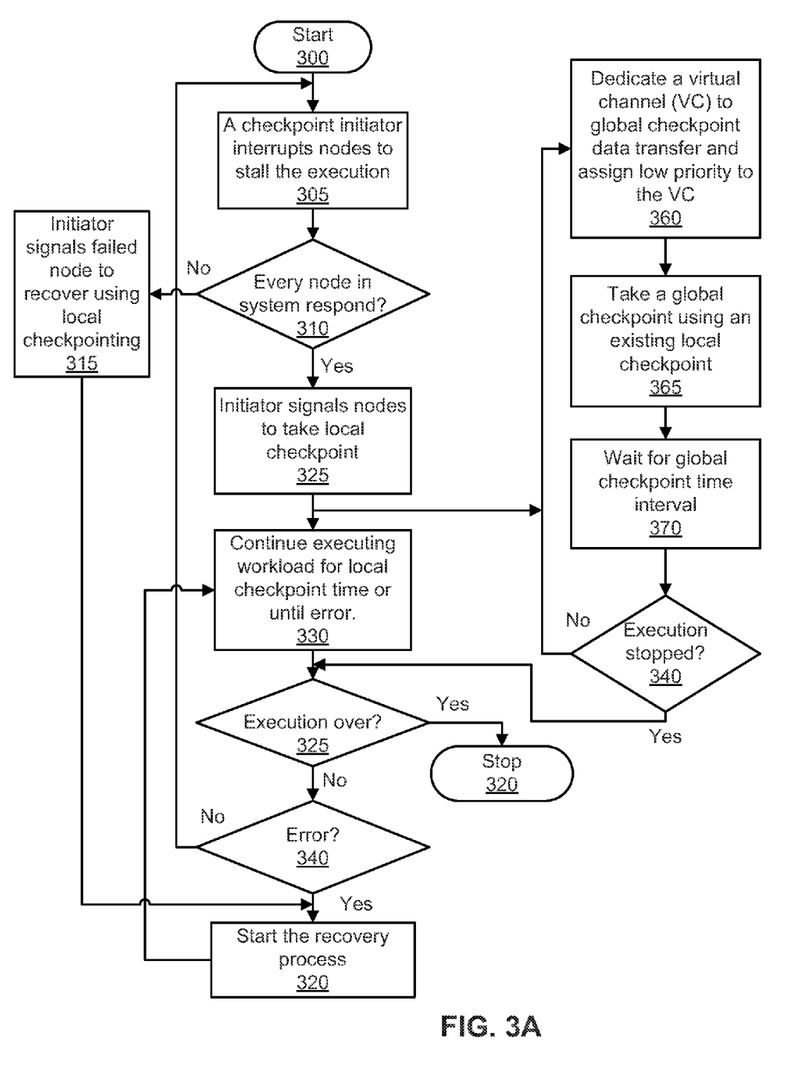
FIG. 3A shows a method for performing local checkpointing and a recovery process in an MPP system in accordance with an example embodiment of the present invention.

FIG. 3A shows a method for performing local checkpointing and a recovery process in an MPP system in accordance with an example embodiment.

The method starts at block 300. The workload and/or program in the MPP system are executing.

According to block 305, a checkpoint initiator (which is either separate node or a separate thread in a node) interrupts all nodes to stall the execution. For example, the workload is stalled and one or more local checkpoints are taken in the MPP system (such as one or more nodes 110A-110N of the MPP system 100 shown in FIG. 1). If a global checkpoint operation is already in progress, commencement of the local checkpoint operations is temporarily delayed until the global checkpoint operation completes.

In one example embodiment, the workload continues to execute for a local checkpoint time interval or until an error occurs. The local checkpoint interval is chosen to provide a balance between the checkpoint overhead and the amount of work lost in the event of a failure. For example, taking frequent checkpoints reduces the amount of work lost during failures. On the other hand, due to the fixed overhead associated with each checkpoint operation, taking checkpoints too frequently can negate the above mentioned benefit.

According to block 310, a determination is made as to whether every node in the system responded. If every node has not responded, flow proceeds to block 315. Here, the initiator signals the failed node to recover using a local checkpoint. Flow proceeds to block 320, and the recovery process is started. If every node has responded, flow proceeds to block 325. Here, the initiator signals all nodes to perform a local checkpoint.

According to block 330, execution of the workload continues for a local checkpoint time interval or until an error occurs. In one embodiment, the local checkpoint time interval is greater than (Go−(n−1)Lo)/n, where Go is the time to complete a global checkpoint, Lo is the time to complete a local checkpoint, and n is the number of different versions of local checkpoints maintained.

According to block 335, a determination is made as to whether execution is over. If execution is over, then flow stops at block 350.

If execution is not over, flow proceeds to block 340 and a determination is made as to whether an error occurred. If an error has occurred, flow proceeds to block 320, and the recovery process is started. If an error has not occurred, flow proceeds back to block 305. The errors can be either transient (soft errors, software crashes, human errors, power, and network failures) or permanent (component or hardware failures).

After the initiator signals nodes to take a checkpoint per block 325, flow proceeds to block 360. Here, a VC (virtual channel) is dedicated for the global checkpoint data transfer, and the VC is assigned a low priority. If the network load is high due to non-checkpoint data, then checkpoint data transmission uses low priority VC.

According to block 365, a global checkpoint is taken using an existing local checkpoint.

According to block 370, flow waits for a global checkpoint time interval.

According to block 375, a determination is made as to whether execution has stopped. If execution has not stopped, flow proceeds back to block 360. If execution has stopped, flow proceeds to block 335.

In one example embodiment, checkpoint process involves storing the memory content of each node along with its processor state to a stable storage medium. As noted, due to sheer volume of data sent over the network to make a checkpoint, traditional systems stall the program and dedicate the entire network bandwidth to complete checkpointing data. However, as system size increases the stall based checkpointing incur significant overhead and degrades performance. Example embodiments use a local/global scheme and remove global checkpointing from the critical path. Ideally, the workload will not encounter slowdowns or delays due to global checkpointing. However, large checkpoint messages sent over the network can clog the network and delay transmission of regular messages sent out by workload. To realize the full benefit of the local/global scheme, one embodiment limits checkpoint messages from blocking other network messages. A typical network switch employs many virtual channels (VC) per input link to avoid deadlock and head of the line blocking. A switch arbitration protocol ensures fair allocation of resources to the messages in the virtual channels. A built-in fairness scheme is avoids starvation among regular messages. However, checkpoint messages are off the critical path and can be assigned low priority without hurting performance.

Example embodiments use either a dedicated virtual channel for backup messages or dynamically turn an existing virtual channel into a low priority buffer that stores checkpoint data. For example, a transmitter (such as one of the processing nodes) transmits global checkpoint traffic over a distinct virtual channel that is different or distinct from application communication. Unlike regular messages, these checkpointing messages will be given the lowest priority all the time and do not benefit from aging mechanism. After a few microseconds, when the network is no longer flooded with checkpoints, this condition can be relaxed and all the messages will be treated fairly. The reconfiguration of switch will happen when the network sees a checkpoint signal from initiator and it ends after x microsecond where x is a function of system size or equal to the average checkpoint time. By doing this, one embodiment ensures that workloads are not delayed or slowed down significantly because of frequent checkpointing enabled by the local/global checkpointing scheme.

Figure 3B:
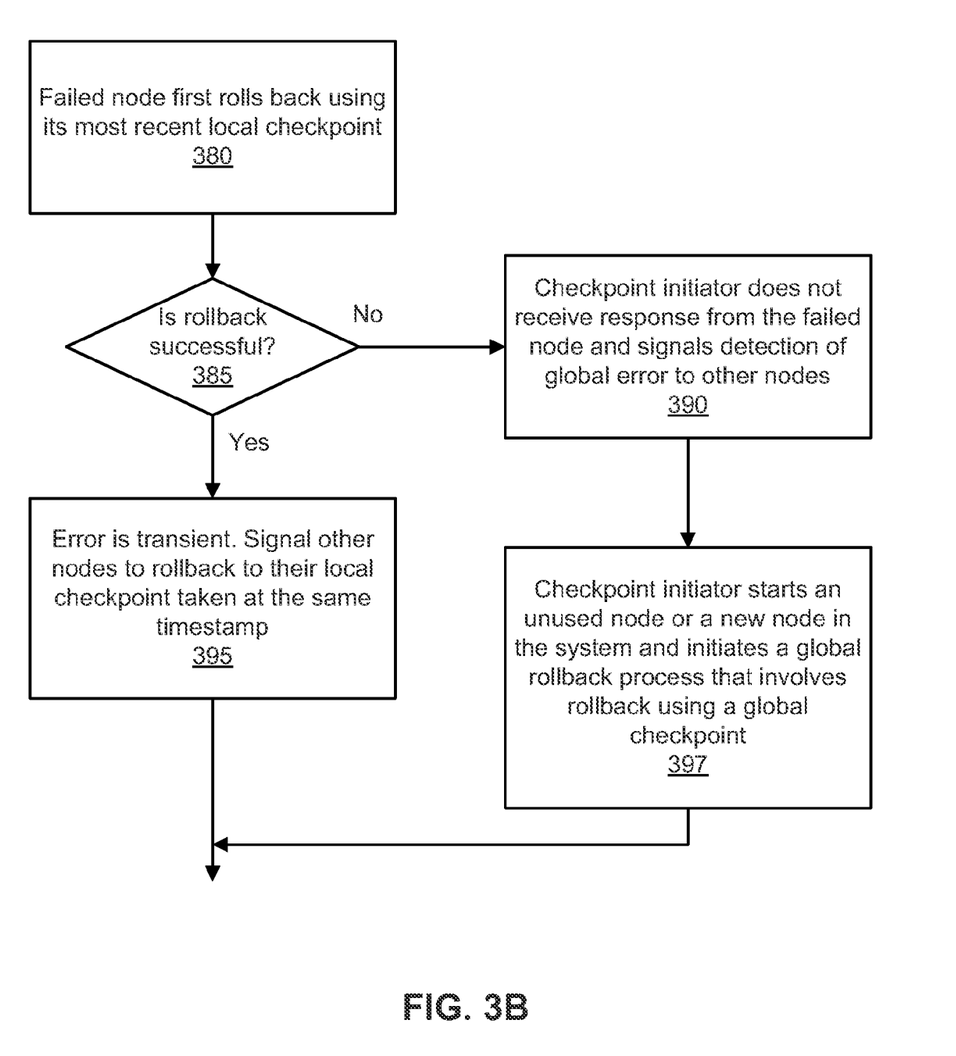
FIG. 3B shows a method for rolling back in an MPP system in accordance with an example embodiment of the present invention.

FIG. 3B is a method for performing a rollback in an MPP system.

According to block 380, a failed node first rolls back using its most recent local checkpoint.

According to block 385, a determination is made as to whether the rollback using the local checkpoint was successful. If the rollback was not successful, flow proceeds to block 390.

At block 390, a checkpoint initiator did not receive a response from the failed node. The checkpoint initiator signals the detection of a global error to other nodes. According to block 397, the checkpoint initiator starts an unused node or a new node in the system and initiates a global rollback process that involves rollback using a global checkpoint.

If the rollback in block 385 is successful, flow proceeds to block 395. Here, the error is transient. The checkpoint initiator signals other nodes to rollback to theft local checkpoint taken at the same timestamp.

In one embodiment, if the error is transient, a rollback occurs using the local checkpoint. During a rollback operation, the entire state of the MPP system is restored using the stored checkpoint state. A local rollback employs a local checkpoint. If the error is due to hardware failures, then a different node (either an idle node or a newly added node) is started, and the MPP system is restored using the globally accessible checkpoint.

With example embodiments, the global checkpoint operations do not significantly stall execution of the workload and/or program. Global checkpoint operations occur during non-critical pathways or times during execution of the workload. For example, such operations occur as a background process.

Global checkpoint operations can occur with varying degrees of frequency depending on the MPP system and workload being executed. For example, in Monte Carlo based simulations, losing data in a single node will not require restarting the workload from the beginning. These workloads can be leveraged to minimize or avoid expensive global checkpoints. Also, a system with a smaller hardware failure rate can appropriately reduce global checkpoint frequency without losing performance.

Example embodiments are not limited to storing local checkpoints in main memory of the local node. In other words, these checkpoints can still be local yet not stored in main memory. For example, such checkpoints are stored in memory connected to a quick path interconnect (Intel™) or hypertransport (AMD™).

Additionally, such memory can be connected to a southbridge through PCI/USB or PCI express slot. These examples are shown in FIGS. 4A-4B.

Figure 4A:
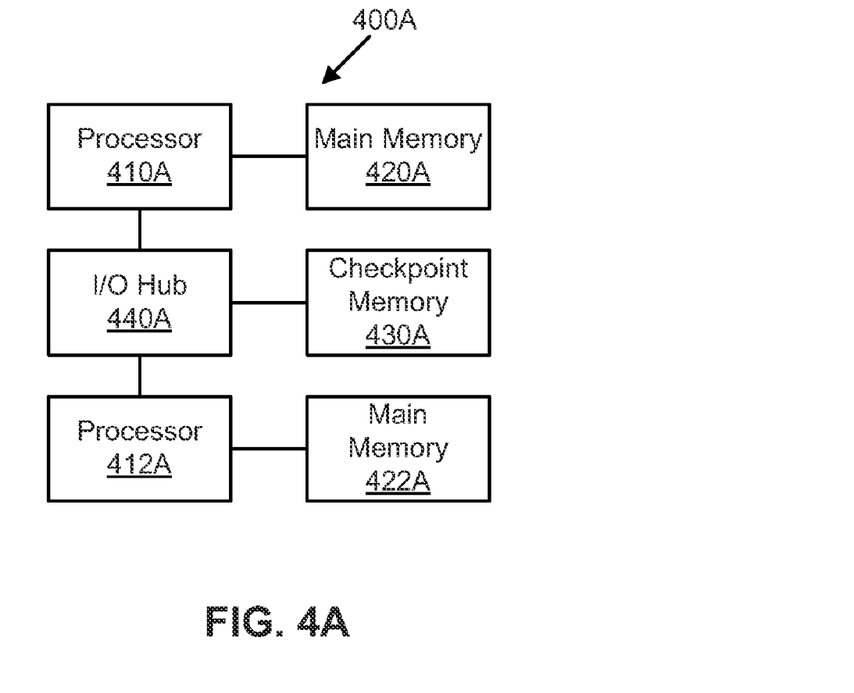
FIG. 4A shows a second alternate embodiment of a processing node locally storing checkpoints in accordance with an example embodiment of the present invention.

FIG. 4A shows a processing node 400A that includes two processors 410A and 412A each connected to a main memory 420A and 422A, an input/output (I/O) hub 440A, and checkpoint memory 430A connected to the I/O hub 440A. The processors 410A and 412A share checkpoint memory 430A through the I/O hub 440A.

Figure 4B:
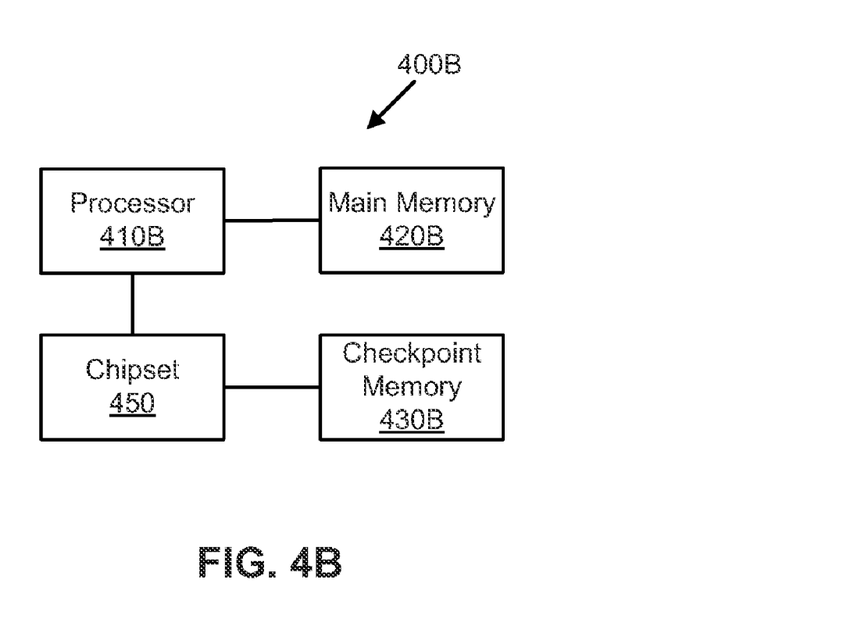
FIG. 4B shows a third alternate embodiment of a processing node locally storing checkpoints in accordance with an example embodiment of the present invention.

FIG. 4B shows a processing node 400B that includes a processor 410B, a main memory 420B, and checkpoint memory 430B. The processor 410B connects to the main memory 420B and a chipset 450. The chipset 450 connects (e.g., via PCI express) to checkpoint memory 430B.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention.

Numerous variations and modifications will become apparent to those skilled in the art once the above disclosure is fully appreciated. It is intended that the following claims be interpreted to embrace all such variations and modifications.

What is claimed is:

1. A method executed by a computer system, the method comprising:
   performing a local checkpoint at a processing node in a massively parallel processing (MPP) system that executes a workload with a plurality of processing nodes;
   storing the local checkpoint in a local memory of the processing node;
   performing, while the workload continues to execute, a global checkpoint from the local checkpoint stored in the local memory; and
   limiting checkpoint messages from blocking other network messages by assigning the checkpoint messages a lower priority than the other network messages.

2. The method of claim 1, wherein the MPP system includes a virtual channel that is dedicated for data transfer of the global checkpoint.

3. The method of claim 1 further comprising, transferring the local checkpoint from the local memory to a storage device in communication with the plurality of processing nodes.

4. The method of claim 1 further comprising, performing the global checkpoint as a background process.

5. The method of claim 1 further comprising, performing and storing the local checkpoint at a faster rate than performing and storing the global checkpoint.

6. The method of claim 1 further comprising, executing the local checkpoint with a local processor in the processing node.

7. The method of claim 1 further comprising, performing the global checkpoint from memories local to each of the plurality of processing nodes, the memories including at least one of main memory, or non-volatile memory.

8. The method of claim 1, wherein the local checkpoint and the global checkpoint occur at different times.

9. A computer system, comprising,
   processing nodes to execute local checkpoints at processors in a massively parallel processing (MPP) system that is to execute a workload; and
   a storage device to store the local checkpoints in memory local to each of the processors, wherein the computer system is to execute a global checkpoint from the local checkpoints while the workload continues to execute, and wherein the computer system is to limit checkpoint messages from blocking other network messages by assigning the checkpoint messages a lower priority than the other network messages.

10. The computer system of claim 9, wherein the computer system is to perform the global checkpoint in parallel with continuous execution of the workload.

11. The computer system of claim 9, wherein the computer system is to stall the workload to execute a local checkpoint at one of the processors while the workload continues to execute.

12. The computer system of claim 9, wherein the memory is a non-volatile memory.

13. The computer system of claim 9, wherein the computer system is to continue to execute local checkpoints until the global checkpoint is requested.

14. A massively parallel processing (MPP) system, comprising:
    a plurality of processing nodes to execute a workload; and a storage device to communicate with the processing nodes, wherein each of the processing nodes includes a processor to execute a local checkpoint and a local memory to store the local checkpoint, wherein the MPP system is to perform a global checkpoint with a first frequency and a local checkpoint with a second frequency, and wherein the second frequency of the global checkpoint is independently adjustable from the first frequency of the local checkpoint.

15. The computer system of claim 14, wherein the local memory comprises non-volatile memory.

16. The computer system of claim 14, wherein the local checkpoint is transferred along a bus to the local memory at a higher speed than the local checkpoint is transferred from the local memory to the storage device.

17. The computer system of claim 14, further comprising a transmitter to transmit global checkpoint traffic over a distinct virtual channel from application communication.

18. The computer system of claim 14, wherein the MPP system is to rollback a transient fault with local checkpoints and is to rollback a permanent node failure with the global checkpoint.

19. The computer system of claim 14, wherein the local are checkpoint is locally stored in at least one of the processing nodes, and the global checkpoint is stored in the storage device.

20. A method executed by a computer system, the method comprising:
performing a local checkpoint at a processing node in a massively parallel processing (MPP) system that executes a workload with a plurality of processing nodes;
storing the local checkpoint in a local memory of the processing node;
performing, while the workload continues to execute, a global checkpoint from the local checkpoint stored in the local memory; and
continuing to execute local checkpoints until the global checkpoint is requested.

21. A computer system, comprising,
processing nodes to execute local checkpoints at processors in a massively parallel processing (MPP) system that is to execute a workload; and
a storage device to store the local checkpoints in a memory local to each of the processors, wherein the computer system is to execute a global checkpoint from the local checkpoints while the workload continues to execute, and wherein the computer system is to continue to execute local checkpoints until the global checkpoint is requested.

* * * * *

UNITED STATES PATENT AND TRADEMARK OFFICE
CERTIFICATE OF CORRECTION

PATENT NO. : 8,108,718 B2  
APPLICATION NO. : 12/618675  
DATED : January 31, 2012  
INVENTOR(S) : Muralimanohar et al.

Page 1 of 1

It is certified that error appears in the above-identified patent and that said Letters Patent is hereby corrected as shown below:

In the Claims

Column 9, line 23, Claim 19, delete "local are" and insert -- local --, therefor.

Signed and Sealed this  
Sixth Day of May, 2014

Michelle K. Lee  
*Deputy Director of the United States Patent and Trademark Office*